United States Patent
Shen et al.

(10) Patent No.: US 8,970,287 B1
(45) Date of Patent: Mar. 3, 2015

(54) APPARATUS AND METHOD OF ADJUSTING ANALOG PARAMETERS FOR EXTENDED TEMPERATURE OPERATION

(71) Applicant: Silicon Laboratories Inc., Austin, TX (US)

(72) Inventors: David Shen, Saratoga, CA (US); Gerald Champagne, Buda, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 13/967,718

(22) Filed: Aug. 15, 2013

(51) Int. Cl.
*H01L 35/00* (2006.01)
*H02M 5/04* (2006.01)

(52) U.S. Cl.
CPC ..................... *H02M 5/04* (2013.01)
USPC .......................................... 327/513

(58) Field of Classification Search
CPC ........................................ G06F 1/567
USPC ................................. 327/512, 513
See application file for complete search history.

(56) References Cited

U.S. PATENT DOCUMENTS

| | | | |
|---|---|---|---|
| 4,746,879 A | 5/1988 | Ma et al. | |
| 5,805,011 A | 9/1998 | Comino | |
| 7,215,972 B2 | 5/2007 | Premakanthan et al. | |
| 7,461,972 B2 * | 12/2008 | Cohen | 374/100 |
| 7,634,197 B2 | 12/2009 | Nelson et al. | |
| 7,734,939 B2 | 6/2010 | Kolinummi et al. | |
| 7,973,684 B2 | 7/2011 | Nolan et al. | |
| 8,140,040 B1 * | 3/2012 | Leon | 455/260 |
| 8,219,040 B2 | 7/2012 | Hsu et al. | |
| 8,390,363 B2 * | 3/2013 | Engl | 327/512 |
| 8,482,339 B1 * | 7/2013 | Giuroiu | 327/513 |
| 8,547,164 B2 * | 10/2013 | Flores et al. | 327/513 |
| 8,598,942 B2 * | 12/2013 | Kawashima | 327/513 |
| 2010/0073069 A1 | 3/2010 | Wang et al. | |
| 2012/0139594 A1 | 6/2012 | Leon | |
| 2013/0113574 A1 | 5/2013 | Hung et al. | |
| 2013/0154723 A1 | 6/2013 | Ko et al. | |

* cited by examiner

*Primary Examiner* — Jeffrey Zweizig

(74) *Attorney, Agent, or Firm* — Cesari & Reed LLP; R. Michael Reed

(57) ABSTRACT

A circuit includes a temperature sensor configured to determine a circuit temperature and includes an analog circuit including one or more controllable circuit elements. The analog circuit includes at least one adjustable parameter. The circuit further includes a controller coupled to the temperature sensor and configured to select a threshold temperature. The controller is configured to control the analog circuit in response to the circuit temperature to selectively adjust at least one adjustable parameter of the analog circuit when the temperature exceeds the selected threshold temperature.

22 Claims, 6 Drawing Sheets

APPARATUS AND METHOD OF ADJUSTING ANALOG PARAMETERS FOR EXTENDED TEMPERATURE OPERATION

FIELD

The present disclosure is generally related to temperature compensation in integrated circuits.

BACKGROUND

Electronic devices that are designed for outdoor use, such as garage door openers, and portable devices, such as remote control devices and portable computing devices, may be exposed to a wide range of environmental temperatures. Further, circuits within such devices may heat up during operation.

Performance of some circuits may degrade when exposed to high temperatures and/or as the circuit temperature increases. Such circuits may be designed to operate over a wide range of temperatures. However, devices that support large temperature ranges may compromise performance at lower temperatures of operation, such as room temperature. In particular, such devices may be designed for operation at an upper limit of a temperature range within which the circuit is expected to operate, which may compromise power efficiency at lower operating temperatures.

SUMMARY

In an embodiment, a circuit includes a temperature sensor configured to determine a circuit temperature and includes an analog circuit including one or more controllable circuit elements. The analog circuit includes at least one adjustable parameter. The circuit further includes a controller coupled to the temperature sensor and configured to select a threshold temperature. The controller is configured to control the analog circuit in response to the circuit temperature to selectively adjust at least one adjustable parameter of the analog circuit when the temperature exceeds the selected threshold temperature.

In another embodiment, a method of adjusting a set of parameters of a circuit based on a circuit temperature includes determining a temperature of a circuit and comparing the temperature to a selected temperature threshold. The method further includes selectively altering at least one of a voltage and a current when the temperature exceeds the selected temperature threshold to extend an operating temperature range of the circuit.

In still another embodiment, a circuit includes a temperature sensor configured to determine a circuit temperature and a controller coupled to the temperature sensor and configured to determine at least one of a transmit state and a receive state. The controller is configured to determine a temperature range corresponding to the circuit temperature and to selectively apply a set of parameters associated with the temperature range from a plurality of sets of parameters when the circuit is not actively transmitting or receiving.

BRIEF DESCRIPTION OF THE DRAWINGS

In the following discussion, the same reference numbers are used in the various embodiments to indicate the same or similar elements.

DETAILED DESCRIPTION OF ILLUSTRATIVE EMBODIMENTS

Figure 1:
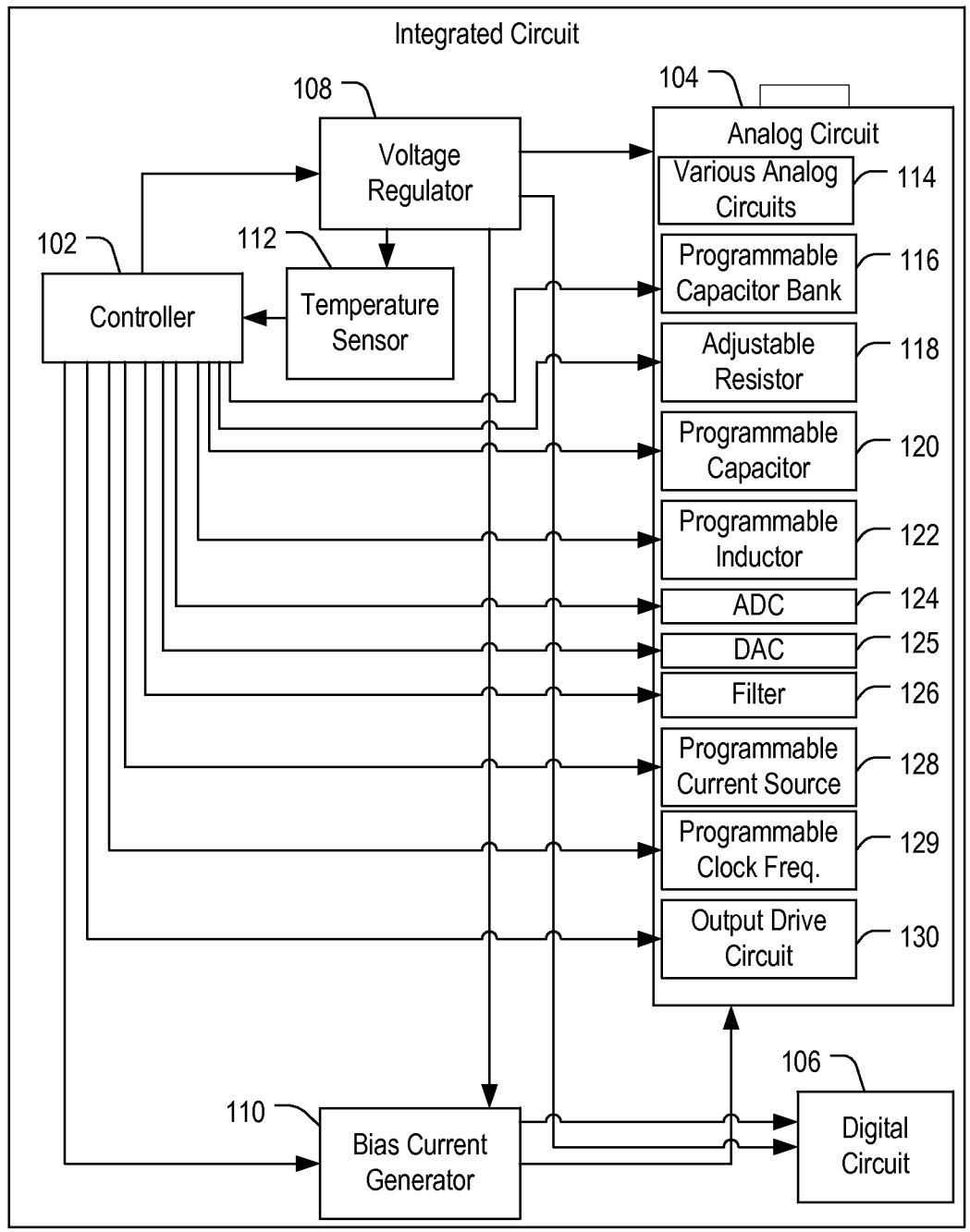
FIG. 1 is a block diagram of a circuit configured to provide a high temperature adjustment according to an embodiment.

Embodiments of an apparatus, circuit, and method are described below that include a controller configured to monitor a temperature of the circuit and to selectively adjust the power supply based on the temperature. In an embodiment, the controller selectively increases the power supply to one or more components when the temperature exceeds a threshold to extend the operating range of the circuit at high temperatures. Further, the controller is configured to reduce the power supply to the one or more components when the temperature falls below the threshold to allow reduced power supply and current consumption at lower temperatures. In an embodiment, the circuit may be configured to operate at temperatures between minus 40 degrees Celsius (−40° C.) and 85° C. (which may be referred to as a normal or typical operating temperature range), and the circuit may adjust the power supply (voltage and/or current) to allow the circuit to operate at temperatures above 85° C., such as 85° C. to about 140° C. (which may be referred to as a high temperature range or an extended temperature range). Alternatively or in addition, the controller may be configured to alter a resistance, a capacitance, another parameter, or any combination thereof when the temperature exceeds a threshold to provide consistent circuit operation across a range of temperatures.

In an embodiment, the circuit includes a controller, which may be implemented as a state machine. The controller may be configured to dynamically poll the temperature of operation and make adjustments to the power supply and/or another parameter based on the temperature. In an example, a digital regulator voltage of 1.08 Volts may be sufficient to close timing during operation at operating temperatures from −40° C. to 85° C. However, at temperatures above 125° C., the circuit timing may degrade. Similarly, an analog circuit may experience temperature dependent behavior. For example, a voltage controlled oscillator (VCO) circuit may have difficulty oscillating at temperatures above 85° C. without increasing the bias current and/or altering another parameter (such as a capacitance or resistance). The state machine, which can be implemented in hardware or firmware, can be configured to dynamically adjust the voltages and/or currents supplied to one or more components and/or to alter a resistance, a capacitance, or another parameter based on temperature. The controller compares the temperature against one or more thresholds and adjusts the state of the regulators, bias, and/or controls based on the temperature. In an embodiment, the circuit includes a memory that stores two or more sets of parameters, where each set defines voltage, current, and/or control settings (such as resistance settings, capacitance settings, and/or other circuit settings, such as a switch configuration) to maintain consistent operation over a predefined range of temperatures. The memory can maintain multiple sets of parameters, each of which may correspond to a different temperature range and defines a circuit configuration to provide consistent performance over the range of temperatures. The controller may be configured to determine the temperature, determine the range of temperatures within which the temperature falls, and to apply the set of parameters that corresponds to the determined range of temperatures. In an example, when the temperature is above normal operating temperatures, the controller may apply a set of parameters that increase the voltage and/or bias currents within the circuit such that the circuit is adjusted to operate correctly within the higher temperature range. In another example, instead of or in addition to adjusting the voltages and/or bias currents, the controller may adjust a resistance and/or a capacitance, for example, to adjust a time constant or other operating parameter An example of a circuit configured to provide a high temperature adjustment is described below with respect to FIG. 1.

FIG. 1 is a block diagram of a circuit 100 configured to provide a high temperature adjustment according to an embodiment. Circuit 100 includes a controller 102, an analog component 104, and a digital component 106. Circuit 100 further includes a voltage regulator 108 coupled to controller 102, to analog component 104, and to digital component 106. Circuit 100 also includes a bias current generator 110 coupled to controller 102, to analog component 104, and to digital component 106. Further, circuit 100 includes a temperature sensor 112 coupled to voltage regulator 108 to receive a power supply and coupled to controller 102 to provide temperature data.

In the illustrated embodiment, analog circuit 104 includes various analog circuits 114 and multiple circuit components that may be digitally controlled, including, but not limited to, a programmable capacitor bank 116, an adjustable resistor circuit 118, a programmable capacitor circuit 120, a programmable inductor circuit 122, an analog-to-digital converter (ADC) 124, a digital-to-analog converter 125, a programmable bandwidth filter 126, a programmable (adjustable) current source 128, programmable clock frequency 129, and a programmable output drive circuit 130. In an embodiment, the programmable capacitor bank, the adjustable resistor circuit 118, and/or the programmable capacitor circuit 120 may include a switch network that may be configured to selectively adjust the associated parameter. In an example, controller 102 may be configured to selectively provide one or more control signals to control selected parameters of one or more of the multiple circuit components.

In an embodiment, controller 102 may receive a temperature signal corresponding to a temperature measurement from temperature sensor 112. In response to the temperature signal, controller 102 may selectively control voltage regulator 108 and/or bias current generator 110 to alter the supply voltages and/or bias currents supplied to one or both of analog component 104 and digital component 106.

In an example, controller 102 is configured to measure the temperature, compare the temperature to a range of temperatures, and selectively adjust at least one of a voltage and current of the circuit 100. In particular, if the temperature is above at first threshold, controller 102 may increase one of the voltage and the current of the circuit 100. If the temperature subsequently falls below the first threshold, controller 102 may reduce one of the voltage and the current of the circuit 100 to reduce overall power consumption. In another example, in response to the temperature exceeding a threshold, controller 102 may be configured to control various analog parameters, such as voltages, currents, device sizes (i.e., number of devices), resistances, inductances, and/or capacitances, to provide a variety of adjustments to at least one of programmable capacitor bank 116, adjustable resistor 118, programmable capacitor 120, programmable inductor 122, ADC analog parameters 124, DAC input code or internal DAC voltages, currents or clock frequency 125, programmable bandwidth filter 126, programmable (adjustable) current source 128, programmable clock frequency 129, and programmable output drive circuit 130.

In an embodiment, controller 102 may include multiple sets of parameters that define a selected configuration for the circuit. Each of the multiple sets of parameters may be associated with a particular range of temperatures, such that when the controller 102 determines the range of temperatures within which the temperature falls, controller 102 may select an associated one of the sets of parameters and may apply the selected set to adjust one or more parameters of analog circuit 104 of circuit 100. Alternatively, the controller 102 may selectively utilize one or more temperature thresholds. In an example, the controller 102 may determine whether the circuit temperature is increasing or decreasing by comparing samples of the circuit temperature. The controller may select a first threshold when the circuit temperature is increasing, compare the circuit temperature to the first threshold, and apply a first set of parameters to adjust operation of the circuit when the circuit temperature exceeds the first threshold. The controller 102 may select a second threshold when the circuit temperature is decreasing, compare the circuit temperature to the second threshold, and apply a second set of parameters to adjust operation of the circuit when the circuit temperature falls below the second threshold. In one example, the controller 102 may increase a voltage or current from a first level to a second level when the circuit temperature exceeds the first threshold, and may return the voltage or current to the first level when the circuit temperature falls below the second threshold. In this example, the second threshold may be lower than the first threshold to prevent the controller 102 from switching back and forth.

In an embodiment, controller 102 may apply a first set of parameters when the temperature of circuit 100 is within a first range of temperatures (such as a temperature range between minus 40° C. and 85° C.). Controller 102 may apply a second set of parameters when the temperature of circuit 100 is within a second range of temperatures (such as a temperature range of 85° C. to 110° C.). Controller 102 may apply a third set of parameters when the temperature of circuit 100 is within a third range of temperatures (such as a temperature range of greater than 110° C.). In an embodiment, the first, second, and third sets of parameters may define different voltages and/or currents. In another embodiment, the first, second and third sets of parameters, in addition to or alternately, may define different capacitances, different resistances, a switch configuration, another circuit parameter, or any combination thereof, to provide a selected time constant and/or to adjust timing and/or performance of the circuit 100 to extend the operating range for consistent operation within the range of temperatures.

In one possible example, controller 102 may control one of voltage regulator 108 and bias generator 110 to provide a voltage of approximately 1.08 V and a bias current of less than 10 mA when the temperature of circuit 100 is within the first range of temperatures. Controller 102 may control voltage regulator 108 to increase the voltage to 1.2 volts or more and may control bias generator 110 to increase the bias current when the temperature of circuit 100 is within the second range of temperatures, and to selectively increase the voltage to approximately 1.8 volts and/or the bias current when the temperature of circuit 100 is within the third range of temperatures. If the temperature of circuit 100 decreases, controller 102 may reduce the voltage and/or the bias current. Thus, changes in circuit operation and timing due to temperature changes can be compensated by increases in voltages and/or bias currents supplied to various components, thereby extending the operating range of circuit 100 to high temperatures (e.g., temperatures above 85° C.). Once the temperature of circuit 100 decreases, controller 102 may reduce the voltages and/or bias currents. Thus, operation of circuit 100 may be extended for operation at high temperatures while maintaining desired (lower) power consumption at normal operating temperatures (e.g., temperatures below 85° C.).

In an embodiment, controller 102 may be implemented as a state machine configured to poll the temperature of circuit 100 by interacting with temperature sensor 112 to receive temperature data. Controller 102 may compare the temperature to one or more temperature thresholds to identify a set of parameters corresponding to the temperature and to select and apply the set of parameters that correspond to the temperature. While the above example utilizes multiple thresholds, it is also possible to utilize one or more equations configured to calculate a power level, a set of parameters, and/or a circuit configuration in response to each temperature measurement. In such an embodiment, the voltages, bias currents, and/or circuit settings may be dynamically calculated.

In an embodiment, controller 102 may control additional analog parameters, including analog calibrations circuit parameters such as resistance, capacitance, transistor drive strength, DAC values, or other controllable parameters. In an embodiment, circuit 100 may include a programmable capacitor bank 116 having controllable parameters for tuning a crystal oscillator, a voltage controlled oscillator, a filter bandwidth (such as by tuning an RC time constant), digital-to-analog (DAC) converter input code or digital-to-analog converter reference voltage and current, and/or for analog-to-digital converter (ADC) bandwidth tuning. In an example, as the temperature of the circuit 100 changes, controller 102 may alter one or more of the controllable parameters to extend operation of circuit 100 to maintain consistent operation at the determined temperature. In one example, the resistance, capacitance, or both may be adjusted to alter a time constant.

In another embodiment, circuit 100 may include digital controls for controlling a capacitance, a resistance, a voltage, and/or a current for an oscillator, such as an RC32 K oscillator or boot oscillator, to control a resistance/capacitance (RC) time constant or current/capacitance time. In still another embodiment, circuit 100 may control an inductance to alter a different performance parameter. In another embodiment, the controller 102 may also select a number of output devices using a power amplifier digital-to-analog converter (DAC) to tune transistor drive strength to control the power output of the power amplifier. It should be appreciated that controller 102 may be configured to control various parameters, such as voltages, currents, device sizes (i.e., number of devices), resistances, and/or capacitances, to provide a variety of tuning functions. In an embodiment, the number of devices may be controlled, for example, by selectively activating one or more switches in a switch network to selectively couple resistors and capacitors to a node to adjust a parameter. In an example, when the temperature increases above a first threshold or falls below a second threshold (which may be lower than the first threshold), controller 102 may adjust one or more analog parameters to maintain operation of the circuit 100 over a range of temperatures, including extending operating of circuit 100 to high temperatures, such as temperatures above 85° C.

While the illustrated example of FIG. 1 depicts a simplified example of a circuit 100 configured to provide a high temperature adjustment, it should be appreciated that the high temperature adjustment functionality may be incorporated in a variety of circuits, including garage door openers, remote keyless entry systems, home automation and security systems, wireless remote controls, and transmitter devices, receiver devices, or any combination thereof. One example of a radio frequency transmitter circuit is described below with respect to FIG. 2.

Figure 2:
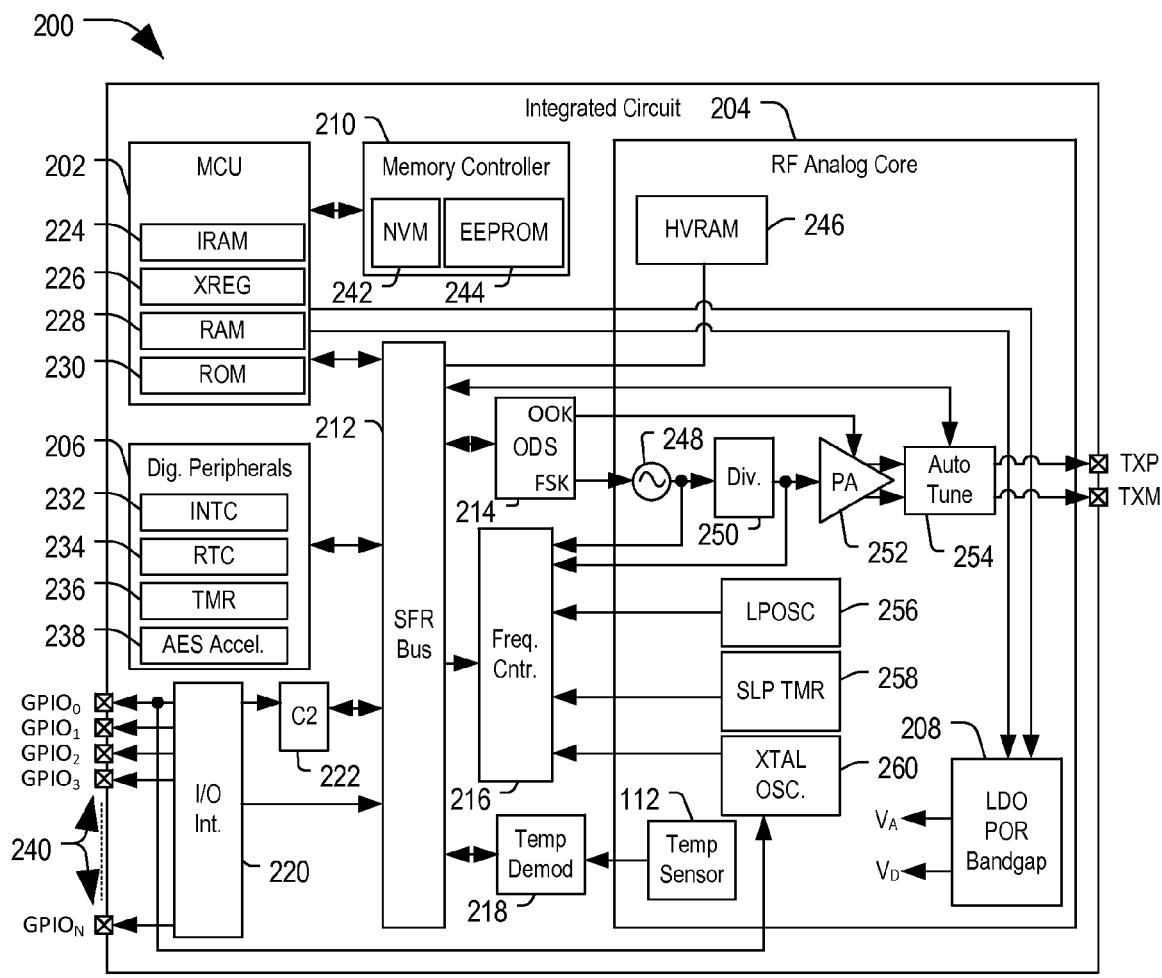
FIG. 2 is a block diagram of a transmitter circuit configured to provide a high temperature adjustment according to an embodiment.

FIG. 2 is a block diagram of a transmitter circuit 200 configured to provide a high temperature adjustment according to an embodiment. Circuit 200 includes a microcontroller unit (MCU) 202 coupled to a radio frequency (RF) analog core 204 and to a memory 210. In an embodiment, MCU 202 may be configured to execute instructions stored in memory 210 to control operation of circuit 200. MCU 202 in conjunction with instructions stored in memory 210 operates as a controller, such as controller 102 in FIG. 1. MCU 202 is also coupled to digital peripherals 206, an output data serializer (ODS) 214, a frequency counter 216, a temperature demodulator 218, an input/output (I/O) interface 220, and a debug and programming interface (labeled "C2") through a special function registers bus 212. I/O interface 220 may be coupled to one or more general purpose I/O pads 240 and to a crystal oscillator (labeled "XTAL OSC") 260 within RF analog core 204.

MCU 202 includes an intelligent random access memory (IRAM) 224, an on-chip register (labeled "XREG") 226, RAM 228, and a read-only memory (ROM) 230. Memory 210 includes a non-volatile memory (labeled "NVM") 242 and an electrically-erasable programmable read-only memory (EEPROM) 244). User software, stored in NVM 242, may be executed by MCU 202 to control operation of and interaction with peripherals, and may cause MCU 202 individually shut down any or all peripherals for power savings.

Digital peripherals 206 include an interrupt configuration (INTC) 232, a real-time clock (RTC) 234, a timer (TMR) 236, and an advanced encryption standard (AES) hardware accelerator 238. RF analog core 204 includes a high voltage RAM (HVRAM) 246 coupled to SFR bus 212. RF analog core 204 further includes a local oscillator 248 including inputs coupled to frequency counter 216 and to ODS 214, and an output coupled to a clock divider 250, which has an output coupled to a power amplifier (PA) 252. PA 252 has two outputs coupled to an auto-tune circuit 254, which has a first output coupled to a transmit-plus pin or pad and a second output coupled to a transmit-minus pin or pad to provide a differential output signal to an antenna for transmission. RF analog core 204 further includes a low power oscillator 256, a sleep timer 258, and XTAL OSC 260. RF analog core 204 also includes a temperature sensor 112 coupled to SFR bus 212 through temperature demodulator 218.

RF analog core 204 includes a low dropout regulator (LDO) 208 including a power on reset and a bandgap reference to provide internal analog and digital supplies, VA and VD, respectively. The power-on reset (POR) circuit monitors the power applied to circuit 200 and generates a reset signal to set circuit 200 into a known state on power-on. The bandgap produces voltage and current references for the analog blocks in circuit 200 and can be shut down when the analog blocks are not used. In an embodiment, LDO 208 may be coupled to MCU 202 and may be responsive to control signals from the MCU 202 and/or to control bits stored in a power register to adjust at least one of a reference voltage and a reference current in response to at least one of the control signals and the control bits.

The on-chip temperature sensor 112 measures the internal temperature of circuit 200, and temperature demodulator 218 converts the sensor output into a binary number representing temperature. The binary number may be used by MCU 202 to compensate the frequency of the local oscillator when the temperature changes based on the devices' frequency response versus temperature calibration. In an embodiment, when the temperature of circuit 200 is within a first temperature range, MCU 202 controls LDO regulator 208 according to a first set of parameters to control analog and/or digital components. When the temperature of circuit 200 is within a second temperature range, MCU 202 controls LDO regulator 208 according to a second set of parameters to control analog and/or digital components. When the temperature of circuit 200 is within a third temperature range, MCU 202 controls LDO regulator 208 according to a third set of parameters to control analog and/or digital components. MCU 202 operates to adjust voltages, currents, resistances, capacitances, inductances, and/or other parameters to maintain consistent operation of circuit 200 over a range of temperatures, including enhancing timing performance for consistent operation at high temperatures while allowing for lower power consumption at lower temperatures.

While the illustrated example of FIG. 2 relates to a transmitter circuit, it should be understood that the temperature-based control may be implemented in a transmitter circuit, a receiver circuit, or a transceiver circuit. Further, the parameters controlled in response to determining the circuit temperature may vary depending on the implementation. In an example, the temperature-based control may be implemented in a portable transmitter device, such as a garage door opener remote control. One example of such a device is described below with respect to FIG. 3.

Figure 3:
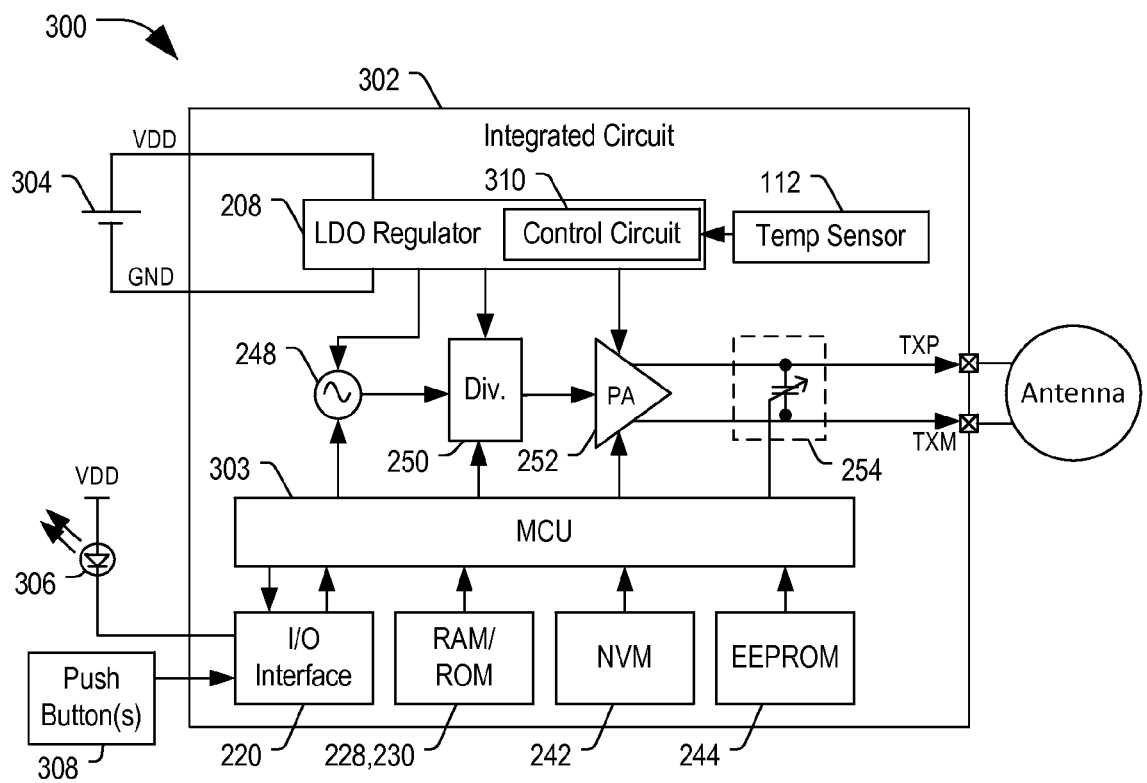
FIG. 3 is a block diagram of an apparatus including an integrated circuit configured to provide a high temperature adjustment according to an embodiment.

FIG. 3 is a block diagram of an apparatus 300 including an integrated circuit 302 configured to provide a high temperature adjustment according to an embodiment. Apparatus 300 includes a power source 304, such as a coin battery or other small profile battery, which is coupled to circuit 302. Further, apparatus 300 includes light emitting diode 306 and one or more push buttons 308, which are coupled to circuit 302. Further, circuit 302 is coupled to an antenna, such as a loop antenna. In an embodiment, apparatus may be a remote control transmitter, such as a garage door opener remote control device.

Circuit 302 includes LDO regulator 208. In the illustrated example, LDO regulator 208 is coupled to temperature sensor 112, local oscillator 248, clock divider 250, PA 252, and auto-tune circuit 254. Circuit 302 further includes MCU 303, which is one possible implementation of MCU 202 in FIG. 2. MCU 303 is coupled to local oscillator 248, clock divider 250, PA 252, and auto-tune circuit 254. Further, MCU 303 is coupled to I/O interface 220, which is coupled to light-emitting diode 306 and to the one or more push buttons 308. MCU 303 is also coupled to RAM/ROM 228/238, NVM 242 and EEPRROM 244.

In the illustrated example, LDO regulator 208 includes a control circuit 310 coupled to temperature sensor 112 and configured to control the voltage and bias currents supplied by LDO regulator 208. In an example, control circuit 310 receives a temperature measurement from temperature sensor 112 and compares the temperature measurement to one or more thresholds. When the temperature is within a first range of temperatures (such as between −40° C. and +85° C.), the control circuit 310 applies a first set of parameters to control various components. When the temperature is above 85° C., the control circuit 310 may apply one or more other sets of parameters to selectively alter one or more parameters of such circuitry, such as capacitance, resistance, inductance, drive signal strength, and/or other parameters. In this example, LDO regulator 208 may include a plurality of regulator outputs to provide voltages and/or bias currents to various circuit components, which voltages and bias currents may be controlled to maintain circuit performance. In an embodiment, one or more of the voltages and/or bias currents may be supplied to control terminals of a switch network to provide a selected circuit configuration.

In an embodiment, as the temperature of circuit 302 increases at a first operating voltage and/or current, the timing of one or more components of circuit 302 may change. Accordingly, control circuit 310 may increase power supplied to one or more components to improve the response time of those components, thereby offsetting timing variations due to temperature. Thus, control circuit 310 operates to extend the operating range of circuit 302 from a normal operating range (between −40° C. and +85° C.) to a higher temperature operating range (above 85° C.). Further, high temperature operation may be temporary (such as heating due to a burst of transmissions), and control circuit 310 may reduce the power supplied to the one or more components of circuit 302 as soon as the control circuit 310 receives an indication of a reduced temperature from sensor 112. In another embodiment, control circuit 310 may alter one or more analog parameters in response to a change in temperature. The analog parameters can include a resistance, a capacitance, an inductance, output drive strength, a current, a voltage, another analog parameter, or any combination thereof. The adjustment of the resistance and/or capacitance may alter a time constant to offset timing variation due to increased temperature. While the discussion of the illustrated example of FIG. 3 is directed to a transmitter circuit, it should be understood that the technique of adjusting various circuit parameters of a circuit based on temperature may be used in receiver circuits, transceiver circuits, other circuits, or any combination thereof. Further, it should be appreciated that the timing of the adjustment may impact the operation of the circuit. For example, in a receiver circuit or a transmitter circuit, it may be undesirable to adjust analog parameters during a receiving operation or during a transmitting operation, respectively. Accordingly, control circuit 310 (or MCU 303), controller 102, and/or MCU 202 may be configured to schedule the adjustment after completion of the transmit or receive operation. Alternatively, control circuit 310 (or MCU 303), controller 102, and/or MCU 202 may cancel a current receive operation or a current transmit operation and make the adjustment. One possible example of a method of providing a high temperature adjustment is described below with respect to FIG. 4.

Figure 4:
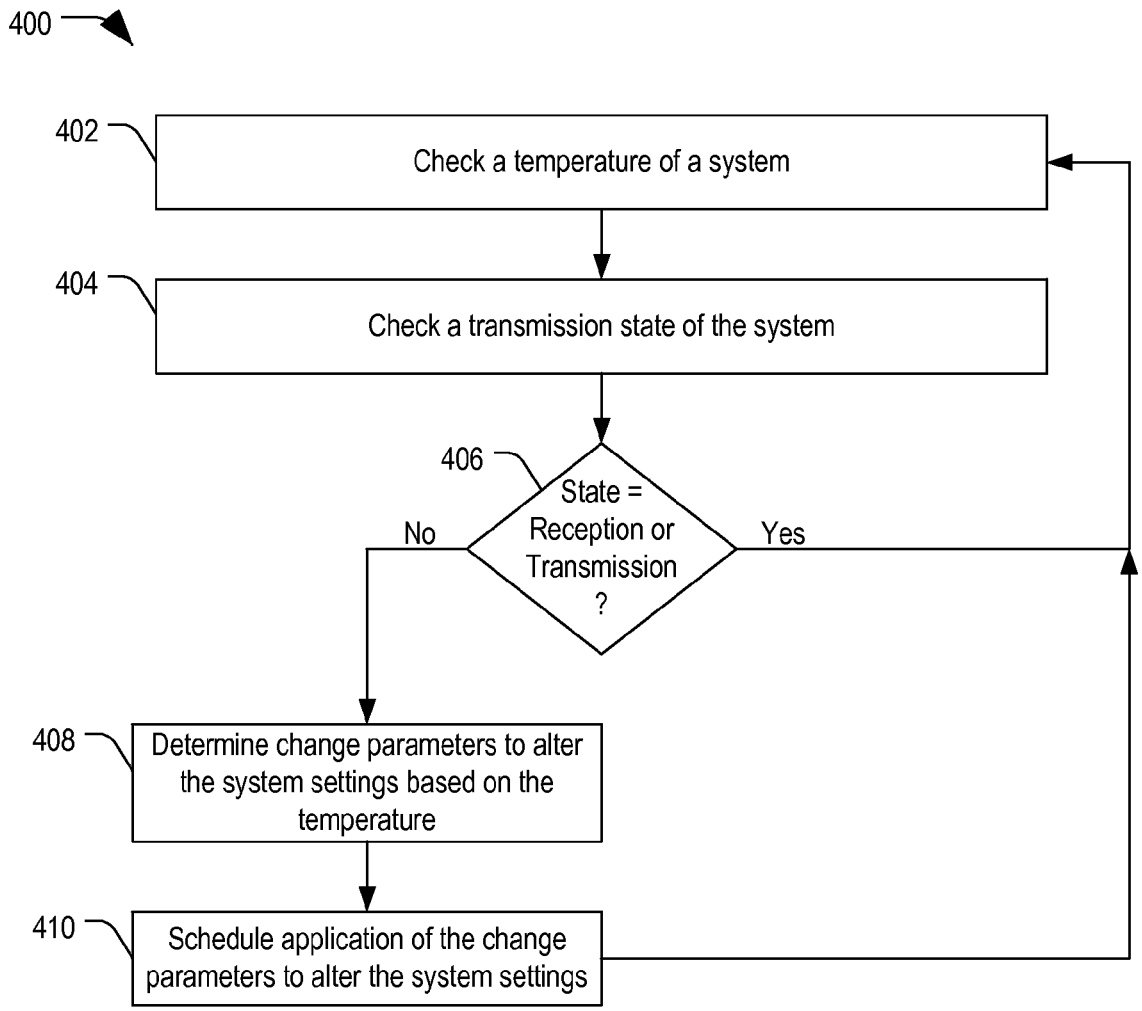
FIG. 4 is a flow diagram of a method of providing a high temperature adjustment according to an embodiment.

FIG. 4 is a flow diagram of a method 400 of providing a high temperature adjustment according to an embodiment. At 402, the temperature of the system (or circuit) is checked. In an example, controller 102, MCU 202, and/or control circuit 310 may receive a temperature signal corresponding to a temperature measurement by a temperature sensor, such as temperature sensor 112. In another example, controller 102, MCU 202, and/or control circuit 310 (or MCU 303) may poll the temperature sensor to determine the temperature measurement. The temperature may be checked periodically, in response to a button press event, or continuously, depending on the implementation. Further, in some embodiments, the temperature may be checked according to a dynamically changing schedule. For example, initially, the temperature may be checked periodically (according to a first period).

However, after a period of time when no packet is transmitted or received, the period may be changed (to a second period) to extend the time between temperature checks in order to extend the battery life. In response to detection of a packet or in response to packet transmission, the controller may return to the initial period.

Advancing to 404, the circuit checks the state of the system, such as whether the system is actively transmitting or receiving data. In an example, the circuit determines if preamble bits have been detected or if packet reception is in progress. Detection of preamble bits represents one possible method to indicate the reception of a valid packet, i.e., active reception of a packet. By checking a detector of a receiver (such as receiver circuitry (not shown) of RF analog core 204 of FIG. 2) for preamble bits, the controller can determine if a valid packet reception operation is currently in progress. Additionally, other indicators of packet reception may include detection of a sync word (a special synchronization string of data) or other identifiers for a valid packet such as MAC (Media Access Control) address, IP (Internet Protocol) address or any type of network or device address. Detection of packets and/or bits may be determined by a detector or by a controller. In an example, controller 102, MCU 202, and/or control circuit 310 (or MCU 303) determines the current state of the circuit to determine whether adjusting parameters would impact operation of the circuit.

Continuing to 406, if the system is receiving or transmitting, the circuit delays adjustments and the method 400 returns to 402 to check the temperature of the system again. In an alternative embodiment, the circuit may schedule the adjustments to be made once the receiving or transmitting operation is completed. In such a case, the circuit may monitor the state of the circuit to detect the completion, and then make the adjustments.

Returning to 406, if the system is not transmitting or receiving, the method 400 advances to 408 and the circuit determines one or more change parameters to alter the system settings based on the temperature. Continuing to 410, the circuit schedules application of the change parameters to alter the system settings.

It should be appreciated that some of the blocks of FIG. 4 may be rearranged or combined without departing from the scope of the disclosure. For example, the circuit may determine the one or more change parameters to alter the system settings (408) prior to determining if the system is receiving or transmitting (406). Additionally, other operations may be included in method 400. For example, determining the one or more change parameters may include determining a temperature range corresponding to a temperature of the circuit, such as by comparing the circuit temperature to one or more thresholds. One possible example of a method of providing a high temperature adjustment using thresholds is described below with respect to FIG. 5.

Figure 5:
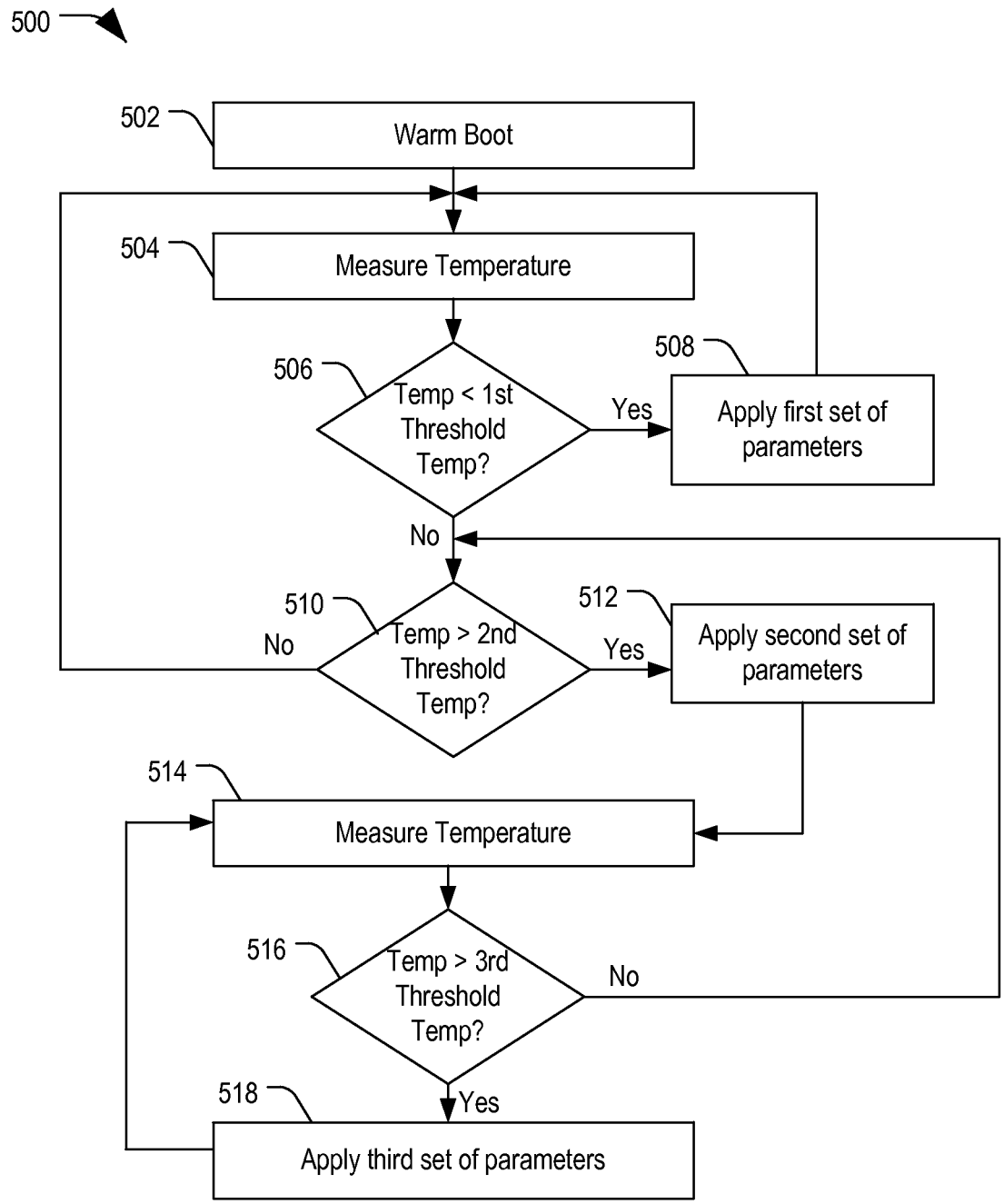
FIG. 5 is a flow diagram of a method of providing a high temperature adjustment according to a second embodiment.

FIG. 5 is a flow diagram of a method 500 of providing a high temperature adjustment according to a second embodiment. At 502, a warm boot occurs. Alternatively, a transition edge of a signal may be received at a general purpose I/O of the circuit. Advancing to 504, the circuit measures the temperature. In an example, the circuit measures the temperature in response to the warm boot and/or the receipt of the transition edge of the signal.

Continuing to 506, if the temperature is less than a first temperature threshold, the method 500 advances to 508 and the circuit applies first set of parameters to control one or more components of the circuit. The first set of parameters may include programmable voltage, current, and/or control settings, including programmable resistances, programmable capacitances, programmable inductances, drive strength settings, or any combination thereof. In an example, the first set of parameters may include voltage and current settings including an operating voltage and bias current that corresponds to a normal operating temperature range (e.g., between −40° C. and +85° C. or between 0° C. and 70° C.). The method 500 returns to 504 and the circuit measures the temperature again.

Otherwise, at 506, if the temperature is greater than a first threshold, the method 500 advances to 510. If, at 510, the temperature exceeds a second temperature threshold, the method 500 continues to 512 and the circuit applies a second set of parameters. In this example, the second set of parameters may include voltage and/or current settings that are higher than the voltage and/or current settings of the first set of parameters. In this example, by raising the voltage and/or current, the response time of various components may be maintained that might otherwise be slowed by the increased temperature. In other words, the increased voltage and/or current may compensate for a slow down due to the increased temperature. Alternatively, the settings may alter another analog parameter, for example, to adjust the bandwidth of an analog-to-digital converter and/or a filter, to adjust resistance, capacitances, inductances, transistor drive strength, other parameters, or any combination thereof. Otherwise, at 510, if the temperature is less than or equal to the second temperature threshold, the method 500 returns to 504 to measure the temperature again.

After applying the second voltage parameters at 512, the method 500 proceeds to 514 and the circuit measures the temperature again. Continuing to 516, if the temperature is less than a third threshold, the method 500 returns to 510 and the circuit compares the temperature to the second threshold. Thus, if the temperature is decreased, the circuit may eventually cycle back to 508 and restore the first set of parameters. Otherwise, at 516, if the temperature exceeds the third threshold, the method 500 continues to 518 and the circuit applies a third set of parameters. The third set of parameters may include voltage and/or current settings that are higher than those of the second set of parameters. By further increasing the voltage and/or current, the response time of the various components of the circuit can be maintained, thereby extending the operating temperature range of the circuit to higher temperatures without sacrificing circuit timing Alternatively, by adjusting a capacitance or resistance, a time constant may be adjusted that may compensate for changes in circuit temperature. Further, other adjustments may be made, as discussed above. After applying the third set of parameters, the method 500 returns to 514 and the circuit measures the temperature again.

In an embodiment, the controller 102, control circuit 310, MCU 202, and/or MCU 303 may implement a state machine configured to check the temperature on a periodic or event driven basis. In addition, the timing of the temperature checks can be dynamically adjusted to minimize disruption to the circuit operation. For example, the system may check the temperature during periods when the circuit is not actively transmitting or receiving. Further, the system may periodically check the temperature during extended periods of inactivity. Additionally, after an extended period of time with no transmission or reception events, the system may dynamically extend the period between temperature checks.

When the temperature exceeds a threshold, it will schedule a change to the controls. However, if the state of the circuit is in the middle of reception or transmission, the settings change can be deferred to a later time, such as when reception and/or transmission is completed. Multiple thresholds can be used to apply different control changes at different temperatures. For example, different settings can be used at 85° C., 115° C., and 125° C. In addition, a hysteresis function can be useful were the setting changes are applied for a first threshold when temperatures are increasing as compared to a second threshold when temperatures are decreasing, preventing the settings from toggling when temperatures are near a threshold.

In a particular embodiment, the circuit may compare the circuit temperature to a first threshold when the voltage/current settings are configured for operation in a first (normal) temperature range and to a second threshold when the voltage/current settings are configured for operation in a second (higher) temperature range. One possible example of a method of providing a high temperature adjustment using a hysteresis function is described below with respect to FIG. 6.

Figure 6:
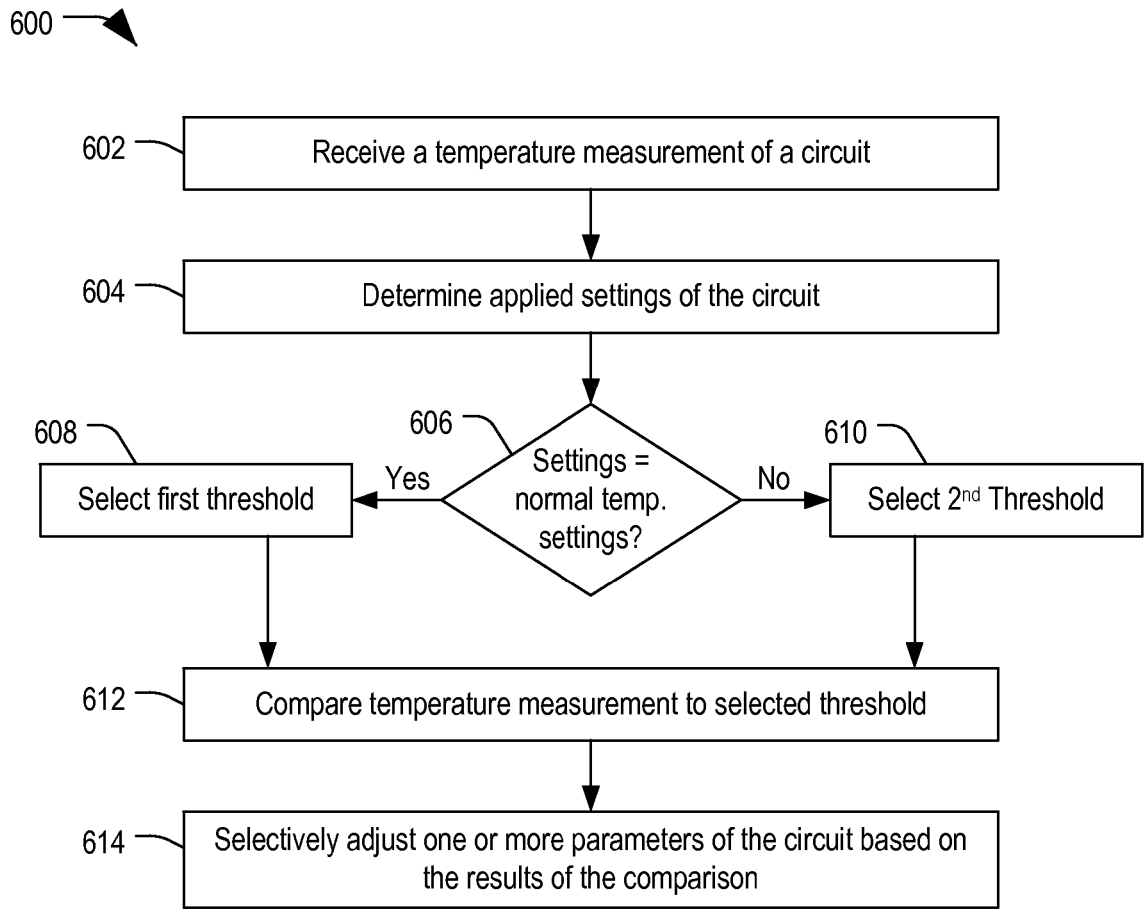
FIG. 6 is a flow diagram of a method of providing a high temperature adjustment using a hysteresis function according to an embodiment.

FIG. 6 is a flow diagram of a method 600 of providing a high temperature adjustment using a hysteresis function according to an embodiment. At 602, a temperature measurement of a circuit is received. The temperature measurement may be received periodically and/or in response to a button press or a periodic signal. Continuing to 604, the applied settings of the circuit are determined. Continuing to 606, if the settings equal the normal temperature settings, the method 600 advances to 608 and the controller selects a first threshold. If, however, the settings are not equal to the normal temperature settings, the method 600 advances to 610 and the controller selects a second threshold.

If, for example, the circuit was operating with high temperature settings applied, the circuit may use a second threshold that is lower than the first threshold to determine when to reduce the voltage/current settings. Transmission and/or receiving operations may increase temperature rapidly, and the second threshold may be lower than the first threshold by an amount that is more than an amount of heating attributable to a typical transmission and/or receiving operation. For example, if a transmission operation typically raises the circuit temperature by 1° C., then the second threshold may be programmed to be approximately 1.5° C. lower than the first threshold, thereby maintaining voltage/current settings of the circuit at a current level until the temperature falls below the first threshold by an amount that should prevent the circuit settings from having to toggle back immediately to the higher level on the very next transmission packet. The second threshold may vary from the first threshold by a larger amount, depending on the particular implementation and heating/cooling time of the circuit.

Moving to 612, the controller compares the temperature measurement to the selected threshold. Advancing to 614, the controller selectively adjusts one or more parameters of the circuit based on the results of the comparison. In an example, the controller may increase the voltage/current settings to compensate for timing variations attributable to heating and may decrease (if the voltage/current settings were configured for high temperature operation) or maintain the voltage/current settings (if the voltage/current settings were configured for a first temperature operation) when the temperature is within the first (normal operating) temperature range. Alternatively, the controller may alter other settings, such as time constants, or other parameters.

It should be understood that, though method 600 discusses selecting between two thresholds, the method may be implemented with any number of thresholds. In an example, the circuit may include multiple thresholds defining first, second, and third temperature ranges. Further, in an example, the circuit may include first, second, and third thresholds to be applied when the controller determines that the temperature is increasing, and may include fourth, fifth, and sixth thresholds to be applied when the controller determines that the temperature is decreasing. In an embodiment, the first and fourth thresholds may correspond to a first temperature range, and the fourth threshold may be lower than the first threshold to provide a level of hysteresis that may prevent the circuit from toggling back and forth between different voltage/current settings when the temperature is near a threshold temperature.

In conjunction with the circuits, devices, and methods described above with respect to FIGS. 1-6, a circuit is configured to compare a circuit temperature to at least one threshold and to selectively adjust at least one of a voltage, a current, a resistance, a capacitance, output drive strength, a circuit configuration, other circuit parameters, or any combination thereof, in response to the comparison. In an embodiment, prior to adjusting, the circuit determines a transmitting/receiving state of the circuit and schedules timing of the adjustment to correspond to a time when the circuit is not transmitting or receiving. Further, in an example, the circuit may utilize hysteresis by selecting a threshold for the comparison depending on whether the circuit is cooling from a high temperature state or heating from a lower temperature state. Adjustments may be periodic or event driven, and may result in the controller altering settings of the circuit to extend operation to higher or lower temperatures or to reduce power consumption at lower temperatures or to increase device performance at higher or lower temperatures. Further, the temperature may be polled periodically, in response to an event (such as a button press), or both. Additionally, the period for checking the temperature may be varied dynamically over time (such as when no transmit or receive operation is performed for a period of time) to extend battery life, for example.

Although the present invention has been described with reference to preferred embodiments, workers skilled in the art will recognize that changes may be made in form and detail without departing from the scope of the invention.

What is claimed is:

1. A circuit comprises:
   a temperature sensor configured to determine a circuit temperature;
   an analog circuit including one or more controllable circuit elements, the analog circuit having at least one adjustable parameter; and
   a controller coupled to the temperature sensor and configured to select a threshold temperature, the controller configured to determine a transmit/receive state of a circuit, the controller configured to control the analog circuit in response to the circuit temperature to selectively adjust at least one adjustable parameter of the analog circuit when the circuit temperature exceeds the selected threshold temperature and the circuit is not transmitting or receiving and to delay the adjustment when the circuit is transmitting or receiving.

2. The circuit of claim 1, wherein the at least one adjustable parameter comprises at least one of a voltage, a current, a resistance, a capacitance, and a transistor drive strength.

3. The circuit of claim 1, further comprising at least one of a receiver circuit, a transmitter circuit, and a transceiver circuit.

4. The circuit of claim 1, wherein the one or more controllable circuit elements comprises an adjustable capacitor bank responsive to a signal from the controller to tune at least one of a crystal oscillator, a voltage controlled oscillator, tunable clock frequency, a bandwidth of a filter, an input code of a digital-to-analog converter, a reference current or voltage of a digital-to-analog-converter and a bandwidth of an analog-to-digital converter.

5. The circuit of claim 1, wherein the one or more controllable circuit elements comprises at least one of an adjustable capacitor, an adjustable resistor, and an adjustable current source responsive to a signal from the controller to tune a time constant.

6. The circuit of claim 1, wherein the one or more controllable circuit elements comprises an output drive circuit configured responsive to a signal from the controller to adjust a transistor drive strength of a power amplifier.

7. The circuit of claim 1, wherein the controller is configured to schedule adjustment of the at least one adjustable parameter for a time when the circuit is not actively transmitting or receiving.

8. The circuit of claim 1, wherein:
the selected threshold comprises a first threshold; and
the controller compares the circuit temperature to the first threshold and applies a first set of parameters to alter the at least one adjustable parameter when the circuit temperature exceeds the first threshold.

9. The circuit of claim 8, wherein:
the selected threshold comprises a second threshold; and
the controller compares the circuit temperature to the second threshold and applies a second set of parameters to alter the at least one adjustable parameter when the circuit temperature exceeds the second threshold.

10. The circuit of claim 8, wherein, when the circuit temperature is decreasing, the controller:
selects a second threshold that is lower than the first threshold; and
compares the circuit temperature to the second threshold and alters the at least one adjustable parameter from the second level to the first level when the circuit temperature falls below the second threshold.

11. The circuit of claim 8, wherein the controller is configured to measure the circuit temperature periodically or in response to an event.

12. A method of adjusting a set of parameters of a circuit based on a circuit temperature, the method comprising:
determining a temperature of a circuit;
comparing the temperature to a selected temperature threshold;
determining a transmission/reception state of the circuit; and
selectively altering one or more parameters of an analog circuit when the temperature exceeds the selected temperature threshold to extend an operating temperature range of the circuit by:
delaying the altering when the circuit is transmitting or receiving; and
otherwise performing the altering when the circuit is not transmitting or receiving.

13. The method of claim 12, wherein selectively altering the one or more parameters comprises altering at least one of a voltage, a current, and a time constant when the temperature exceeds the selected temperature threshold.

14. The method of claim 12, further comprising:
selecting a first threshold from a plurality of thresholds when the temperature is increasing; and
selecting a second threshold from a plurality of thresholds when the temperature is decreasing.

15. The method of claim 12, wherein selectively altering the one or more parameters comprises:
when the circuit is actively transmitting or receiving a signal, scheduling alteration of the one or more parameters for a time after completion of the transmitting or receiving.

16. The method of claim 12, wherein determining the temperature of the circuit comprises:
dynamically scheduling the determination of the temperature by sensing the temperature during periods when the circuit is not actively transmitting or receiving a signal.

17. The method of claim 12, wherein comparing the temperature to the selected threshold comprises determining a temperature range corresponding to the temperature of the circuit.

18. The method of claim 17, wherein selectively altering the one or more parameters comprises:
applying a first set of parameters when the temperature is within a first temperature range; and
applying a second set of parameters when the temperature is within a second temperature range.

19. The method of claim 12, wherein comparing the temperature to the selected temperature threshold comprises:
determining whether the temperature is increasing or decreasing;
comparing the temperature to a first temperature threshold when the temperature is increasing;
comparing the temperature to a second temperature threshold when the temperature is decreasing; and
selecting a set of parameters from a plurality of sets of parameters based on the comparison.

20. A circuit comprising:
a temperature sensor configured to determine a circuit temperature; and
a controller coupled to the temperature sensor and configured to determine at least one of a transmit state and a receive state, the controller configured to determine a temperature range corresponding to the circuit temperature and to selectively apply a set of parameters associated with the temperature range from a plurality of sets of parameters when the circuit is not actively transmitting or receiving.

21. The circuit of claim 20, wherein the set of parameters comprises at least one of a voltage parameter, a current parameter, a resistance parameter, a capacitance parameter, a transistor drive strength parameter, and a time constant parameter.

22. The circuit of claim 20, wherein the set of parameters adjust operation of at least one element of an analog circuit to compensate for a change in temperature to extend circuit operation to temperatures above 85 degrees Celsius.

* * * * *